(12) United States Patent
Berthier

(10) Patent No.: US 12,546,384 B2
(45) Date of Patent: Feb. 10, 2026

(54) ONE-PIECE RECIRCULATION PART, RECIRCULATION THREADED MEMBER AND BALLSCREW MECHANISM

(71) Applicant: NTN EUROPE, Annecy (FR)

(72) Inventor: Julien Berthier, Saint-Jorioz (FR)

(73) Assignee: NTN EUROPE, Annecy (FR)

( * ) Notice: Subject to any disclaimer, the term of this patent is extended or adjusted under 35 U.S.C. 154(b) by 0 days.

(21) Appl. No.: 18/940,929

(22) Filed: Nov. 8, 2024

(65) Prior Publication Data

US 2025/0155005 A1    May 15, 2025

(30) Foreign Application Priority Data

Nov. 11, 2023 (FR) ........................................ 2312343

(51) Int. Cl.
*F16H 25/22* (2006.01)

(52) U.S. Cl.
CPC ............................... *F16H 25/2228* (2013.01)

(58) Field of Classification Search
CPC ............ F16H 25/2204; F16H 25/2223; F16H 25/2228; F16H 25/2214; F16H 25/24
See application file for complete search history.

(56) References Cited

U.S. PATENT DOCUMENTS

| | | | | |
|---|---|---|---|---|
| 3,161,073 A * | 12/1964 | Deutsch | .............. | F16H 25/2223 74/424.87 |
| 2002/0063014 A1 * | 5/2002 | Yoshida | .............. | F16H 25/2223 180/444 |
| 2005/0217401 A1 | 10/2005 | Osterlanger et al. | | |
| 2011/0146436 A1 * | 6/2011 | Brown | ................ | F16H 25/2223 74/424.82 |
| 2016/0273633 A1 * | 9/2016 | Heck | .................... | F16H 25/2223 |
| 2018/0216711 A1 * | 8/2018 | Kreutzer | ............. | F16H 25/2223 |
| 2022/0340194 A1 * | 10/2022 | Shin | ......................... | B62D 3/08 |

FOREIGN PATENT DOCUMENTS

| | | | | |
|---|---|---|---|---|
| DE | 10242297 A1 * | 3/2004 | ......... | F16H 25/2223 |
| EP | 1537345 B1 | 10/2011 | | |

OTHER PUBLICATIONS

Search Report mailed May 12, 2024, in connection with French Patent Application No. 2312343, 19 pgs. (including translations).

* cited by examiner

*Primary Examiner* — Zakaria Elahmadi
(74) *Attorney, Agent, or Firm* — Chiesa Shahinian & Giantomasi PC

(57) ABSTRACT

A one-piece recirculation part intended to be housed in a cavity of a threaded member of a ballscrew mechanism comprises a bottom, facing in a reference direction of a reference axis, a recirculation path facing in the opposite direction and designed to pass through a thread of the threaded member, and at least one deflector, projecting from the recirculation path in the opposite direction to the reference direction. The deflector forms a guide face located at a distance from the recirculation path and facing in the reference direction, opposite a lumen in the one-piece part which extends parallel to the reference axis and opens onto the bottom and the recirculation path. When projected orthogonally onto a reference plane perpendicular to the reference axis, the first lumen surrounds or coincides with the guide face of the first deflector.

14 Claims, 5 Drawing Sheets

ONE-PIECE RECIRCULATION PART, RECIRCULATION THREADED MEMBER AND BALLSCREW MECHANISM

CROSS-REFERENCE TO RELATED APPLICATIONS

This application claims the benefit of priority under 35 U.S.C. 119 to French Patent Application No. 2312343, filed Nov. 11, 2023; the disclosure of which is incorporated herein by reference in its entirety.

TECHNICAL FIELD OF THE INVENTION

The invention relates to a ballscrew mechanism, and more specifically to a ballscrew mechanism provided with recirculators intended to connect two adjacent portions of a groove of a thread of the ballscrew mechanism on either side of a thread of the threading. It relates in particular to a recirculator for such a mechanism, and to a recirculation threaded member, which may be a screw or a nut, incorporating such a recirculator.

BACKGROUND

EP 1 537 345 B1 describes a ballscrew mechanism whose nut has a thread for guiding the balls, and is fitted with a one-piece recirculation part housed in a cavity housing the nut, passing through a thread of the threading, to define an S-shaped recirculation path connecting two portions of the groove of the threading on either side of the thread. The one-piece recirculation part has guide faces intended to deflect the balls along the S-shaped path. It would be impossible to mold the part directly, as there would be too many undercuts. For this reason, the one-piece part is made up of two half-parts connected by a joint, enabling the part to be molded in an open position, in an axial mold, and then to be closed in its final operational position. However, such a manufacturing method remains complex.

Document US 2018/0216711 A1 describes a ballscrew mechanism whose nut has a threading for guiding the balls, and is fitted with a one-piece recirculation part housed in a closed cavity housing the nut, passing through a thread of the threading, to define an S-shaped recirculation path connecting two portions of the groove of the threading on either side of the thread. The recirculation part furthermore has deflectors at both ends of the recirculation path, facing the recirculation path to guide the balls towards the recirculation path. The resulting part has a complex geometry with undercuts that make molding complex.

SUMMARY

The aim of the invention is to overcome the disadvantages of the current state of the art and to offer a one-piece recirculation part that is simple to manufacture.

According to a first aspect of the invention, a one-piece recirculation part is proposed to be housed in a cavity of a threaded member of a ballscrew mechanism, the one-piece recirculation part having:
  a bottom, turned in a reference direction parallel to a reference axis of the recirculation part and intended to bear against a bottom of the cavity of the threaded member;
  a recirculation path turned in a direction opposite to the reference direction, designed to pass through a thread of the threaded member along a recirculation path;
  at least one first deflector, projecting from the recirculation path in the opposite direction to the reference direction, the first deflector forming a guide face, located at a distance from the recirculation path and facing in the reference direction; and
  at least one first lumen which opens out on one end onto the bottom and on a second end onto the recirculation path, opposite the guide face, the first lumen having an orthogonal projection onto a reference plane perpendicular to the reference axis, which surrounds or coincides with the orthogonal projection of the guide face of the first deflector onto the reference plane.

The first lumen prevents the first deflector from overlapping with the body of the one-piece part, delimited by the bottom, side walls and recirculation path, seen in projection on the reference plane. This allows the guide face to be molded axially without undercuts along an axis parallel to the reference axis. The invention takes advantage of the fact that in the area where the deflector is required to curve the recirculation path, the balls of the ballscrew mechanism, which form a line of balls with very little relative clearance, are lifted closer to the recirculation path to come into contact with the guide face of the deflector. It is therefore possible to provide the lumen, which at least partially interrupts the recirculation path, without affecting the guidance of the balls along the recirculation path. In addition, the lumen reduces the amount of material needed to form the one-piece recirculation part.

In one embodiment, the one-piece recirculation part has a second deflector, projecting from the recirculation path in the opposite direction to the reference direction, the second deflector forming a guide face, located at a distance from the recirculation path and facing in the reference direction, the one-piece part comprising at least one second lumen opening onto the bottom and onto the recirculation path of the one-piece recirculation part, opposite the guide face of the second deflector, the second lumen having an orthogonal projection onto the reference plane, which surrounds or coincides with the orthogonal projection of the guide face of the second deflector onto the reference plane.

In one embodiment, the recirculation path describes an S-shaped path with two ends, each intended to be continuous with a thread root on a side of the thread through which the recirculation path passes. Preferably, the first deflector is located at a curved portion of the S-shaped path, and the second deflector is located at a second curved portion of the S-shaped path.

In one embodiment, the bottom of the one-piece recirculation part is flat. Preferably, the bottom of the one-piece recirculation part is perpendicular to the reference axis. Alternatively, the bottom of the one-piece part can be a left-hand surface, e.g. concave or convex, for example a cylindrical envelope surface.

The first port, and where applicable the second port, preferably have an envelope consisting of a controlled surface, preferably with a generatrix forming a draft angle with the reference axis, preferably greater than 2°, open towards the bottom of the one-piece part.

In a preferred embodiment, the first and, if applicable, second lumen open without undercuts in the reference direction, which means that when any two sections of a lumen are projected orthogonally onto the reference plane by section planes parallel to the reference plane, the projection of the section by the section plane closest to the bottom of the one-piece part surrounds and, if applicable, contacts the projection of the section by the section plane furthest from the bottom of the one-piece part. The one-piece part can then be manufactured by axial molding.

Another aspect of the invention relates to a recirculation threaded member for a ballscrew mechanism, the recirculation threaded member having a threading, the recirculation threaded member being equipped with one or more recirculators, each of the recirculators being housed in a housing cavity of the recirculation threaded member, the housing cavity passing through a thread of the threading, characterized in that each of the recirculators is a one-piece recirculation part according to any one of the preceding claims, the bottom of the one-piece recirculation part bearing against a bottom of the housing cavity, the recirculation path of the one-piece recirculation part interconnecting two portions of a groove in the thread on either side of the thread traversed by the housing cavity. Preferably, the recirculation threaded member is equipped with a number N of recirculators greater than or equal to two, and preferably equal to three, angularly offset from one another by an angle $$\frac{2\pi}{N}$$

around a helix axis of the threading.

In one embodiment, the recirculation threaded member can be a ballscrew mechanism screw or a ballscrew mechanism nut.

Another aspect of the invention relates to a ballscrew mechanism comprising two threaded members, namely a screw and a nut, and balls, one of the two threaded members being a recirculation threaded member as described above, the ballscrew mechanism further comprising balls forming one or more lines of balls, each associated with one of the one-piece recirculation parts, and each arranged along a loop path passing through the recirculation path of the associated one-piece recirculation part and through the two portions of the thread groove on either side of the thread through which the housing cavity passes.

BRIEF DESCRIPTION OF THE DRAWINGS

Other features and advantages of the invention will emerge on reading the following disclosure, with reference to the appended figures.

For greater clarity, identical or similar elements are identified by identical reference signs in all of the Figures.

DETAILED DESCRIPTION

Figure 1:
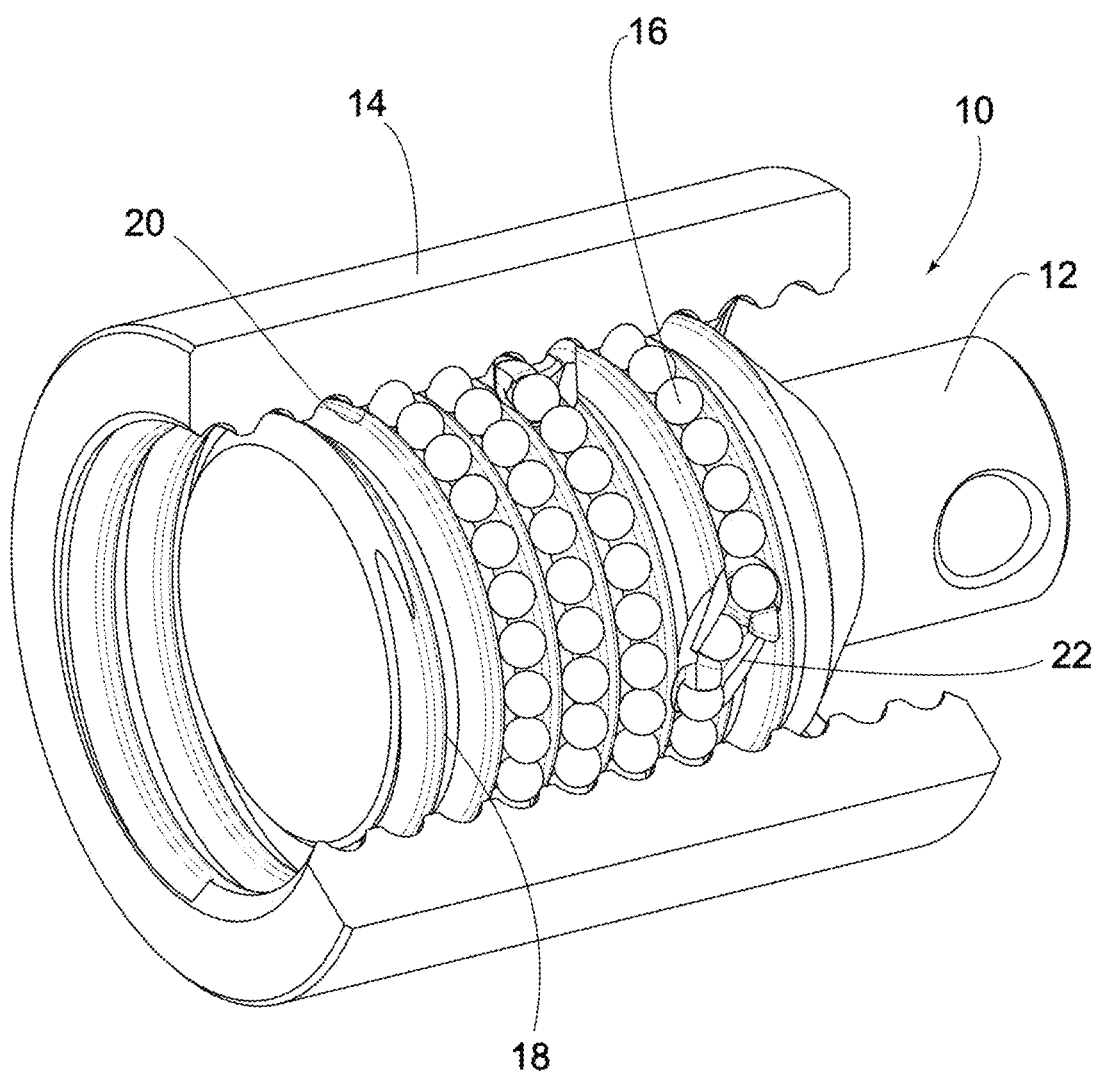
FIG. 1 shows a ballscrew mechanism according to one embodiment of the invention.

FIG. 1 shows a ballscrew mechanism 10 comprising two threaded members, namely a screw 12 and a nut 14, and balls 16, arranged between a threading 18 of the screw 12 and a threading 20 of the nut 14, to guide the relative helical movement between the screw 12 and the nut 14. Each threading 18, 20 is defined by a helical groove whose flanks form a helical thread.

Figure 2:
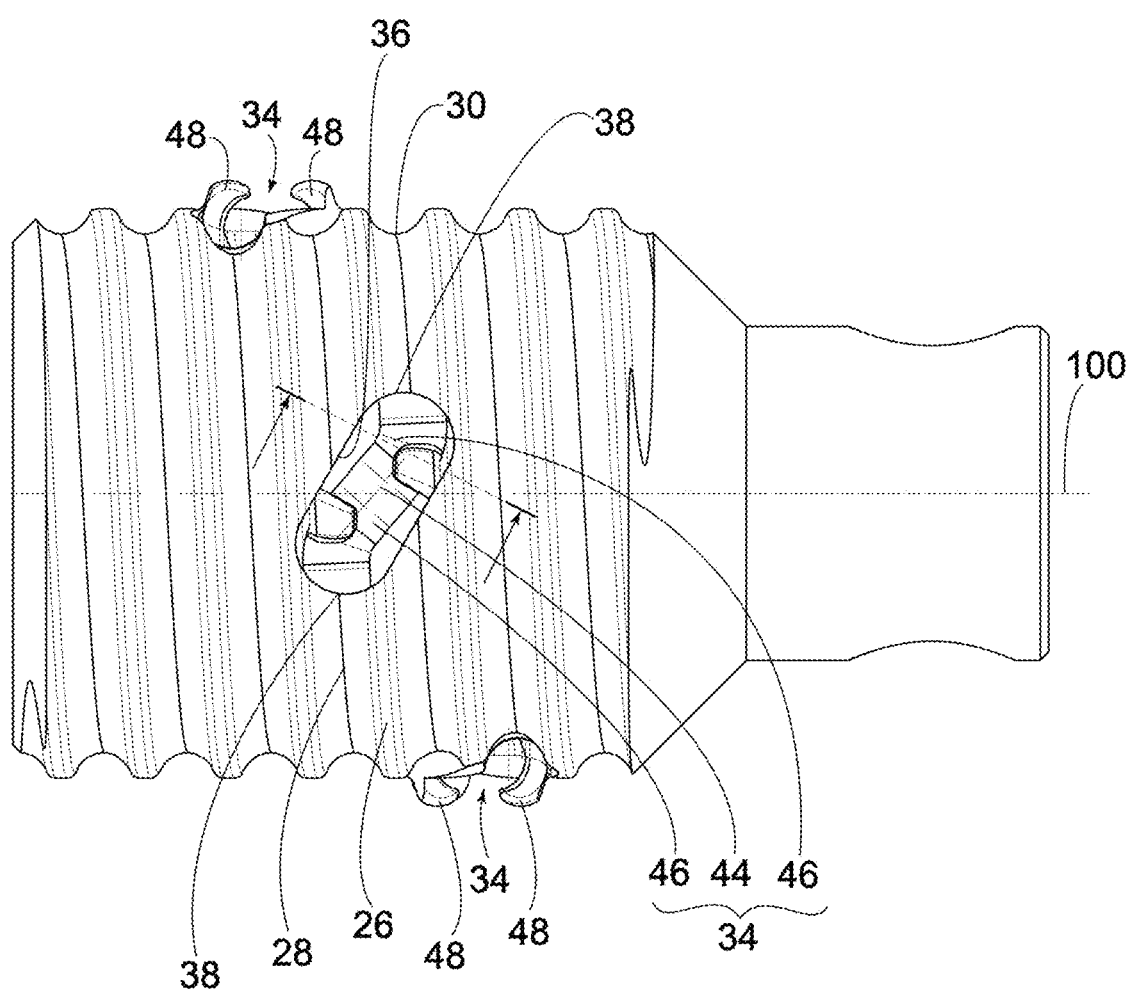
FIG. 2 shows a recirculation threaded member, in this case a screw, of the ballscrew mechanism shown in FIG. 1, fitted with one-piece recirculation parts according to one embodiment of the invention.
Figure 3:
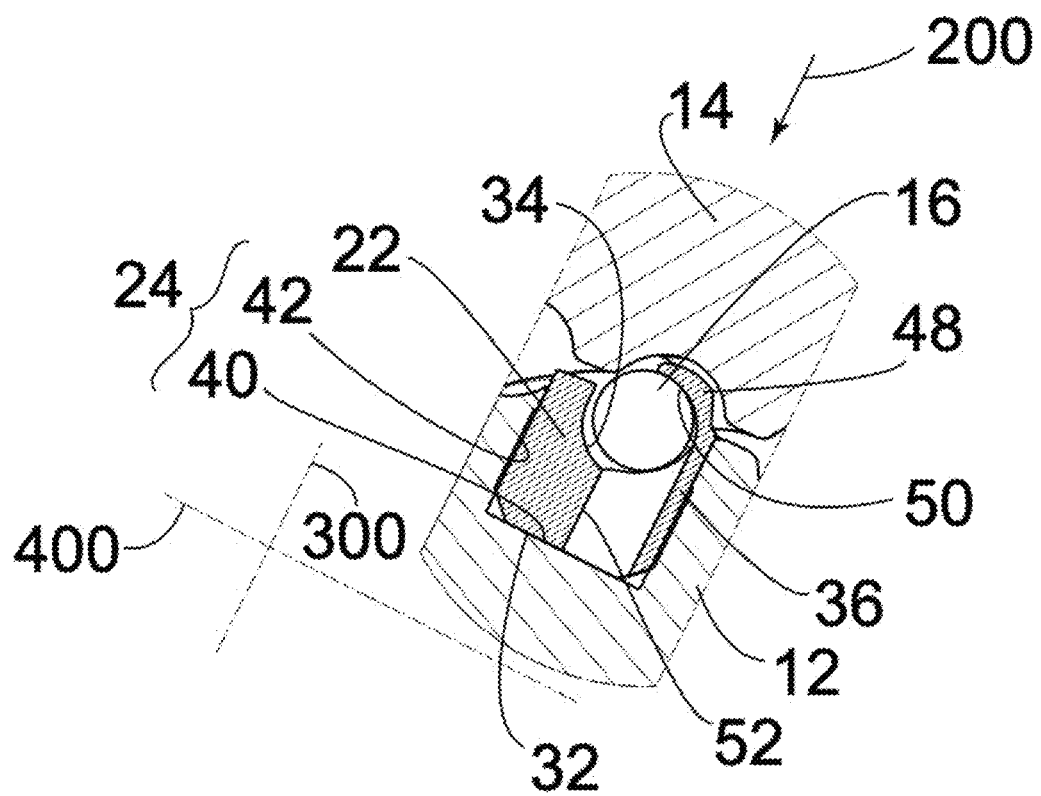
FIG. 3 shows a cross-section along sectional plane III-III, showing a detail of the insertion of one of the one-piece recirculation parts into the threaded member shown in FIG. 2.

One of the two threaded members, in this case the screw 12, will be referred to in the following as a recirculation threaded member, as it is fitted with recirculators 22, as shown in FIGS. 2 and 3. Each of the recirculators 22 is housed in an associated housing cavity 24, formed in the recirculation threaded member 12, and which passes through a thread 26 of the threading 18 of the recirculation threaded member 12. To open onto two portions 28, 30 of the groove of the threading on either side of thread 26.

In this embodiment, there are four recirculators 22, each of which, together with the portions 28, 30 of the groove of the threading on either side of the thread 26, defines a one-turn looping path for a line of balls 16. The four recirculators 22 are arranged at a distance from each other along the axis 100 of the recirculation threaded member 12, axially spaced apart by a distance greater than a helix pitch P of the threading of the recirculation threaded member, and angularly offset by 90° from each other. However, in other embodiments, the number N of recirculators can be any number. For a balanced, compact arrangement, an angular offset of $$\frac{2\pi}{N}$$

and an axial distance of $$\frac{N+1}{N}P$$

between two adjacent recirculators 22.

Figure 4:
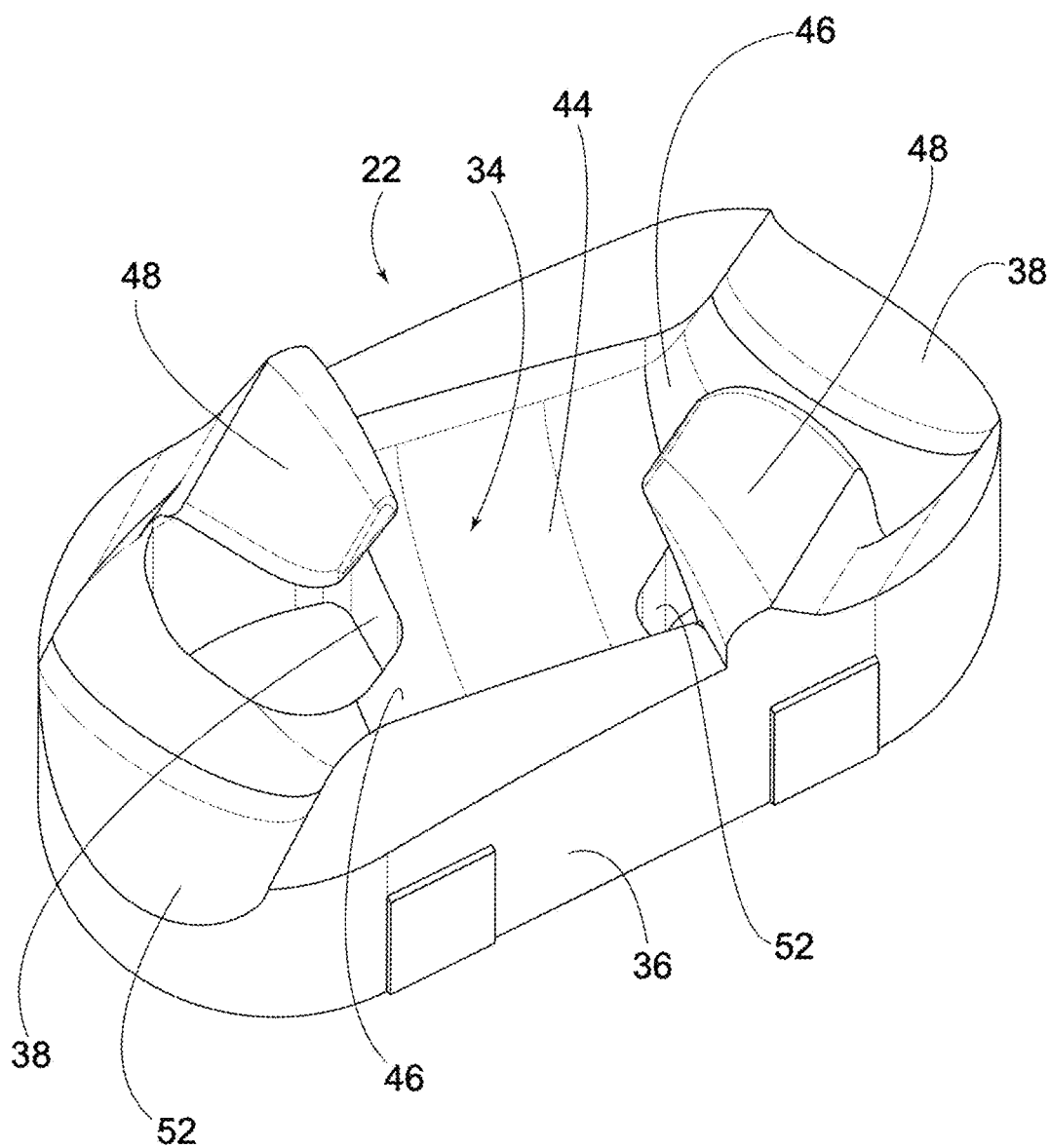
FIG. 4 shows the one-piece part of FIG. 2.

Remarkably, each recirculator 22 is in the form of a one-piece part manufactured by molding in an axial mold. The one-piece part 22, shown in FIG. 4, comprises a bottom 32, facing in a reference direction 200 parallel to a reference axis 300 of the one-piece part 22, a top face opposite the bottom 32 and on which a recirculation path 34 is formed, and side walls 36 joining the bottom to the top face. The recirculation path 34 is a groove whose profile may be, for example, circular-arc or ogive-shaped, defining a recirculation path between two ends 38 of the groove. When the one-piece recirculation part 22 is housed in the associated housing cavity 24 of the recirculation threaded member 12, the bottom 32 of the one-piece recirculation part 22 rests against a bottom 40 of the housing cavity 24, the side walls 36 of the one-piece recirculation part 22 abut side walls 42 of the housing cavity 24, and the ends 38 of the recirculating path 34 are aligned with the threading groove portions 28, 30 on either side of the thread 26 of the recirculation threaded member 12.

The recirculation path 34 is preferably S-shaped, with a median portion 44 connected to the ends 38 by two curved portions 46 ensuring two changes of direction.

The one-piece recirculation part 22 further comprises two deflectors 48, each positioned at one of the two curved portions 46, projecting from the recirculation path 34 in the opposite direction to the reference direction 200, and each forming a guide face 50, facing in the reference direction 200, at a distance from the recirculation path 34 in the opposite direction to the reference direction 200.

Remarkably, the one-piece part 22 has two lumens 52, each associated with one of the two deflectors 48. The two lumens 52 extend parallel to the same reference axis 300 of the one-piece part and open at one end onto the bottom 32 and at the opposite end onto the recirculation path 34, opposite the associated deflector 48. The two lumens 52 have an open draft angle towards the bottom 32, sufficient to allow axial demolding, for example greater than 2°.

Figure 5:
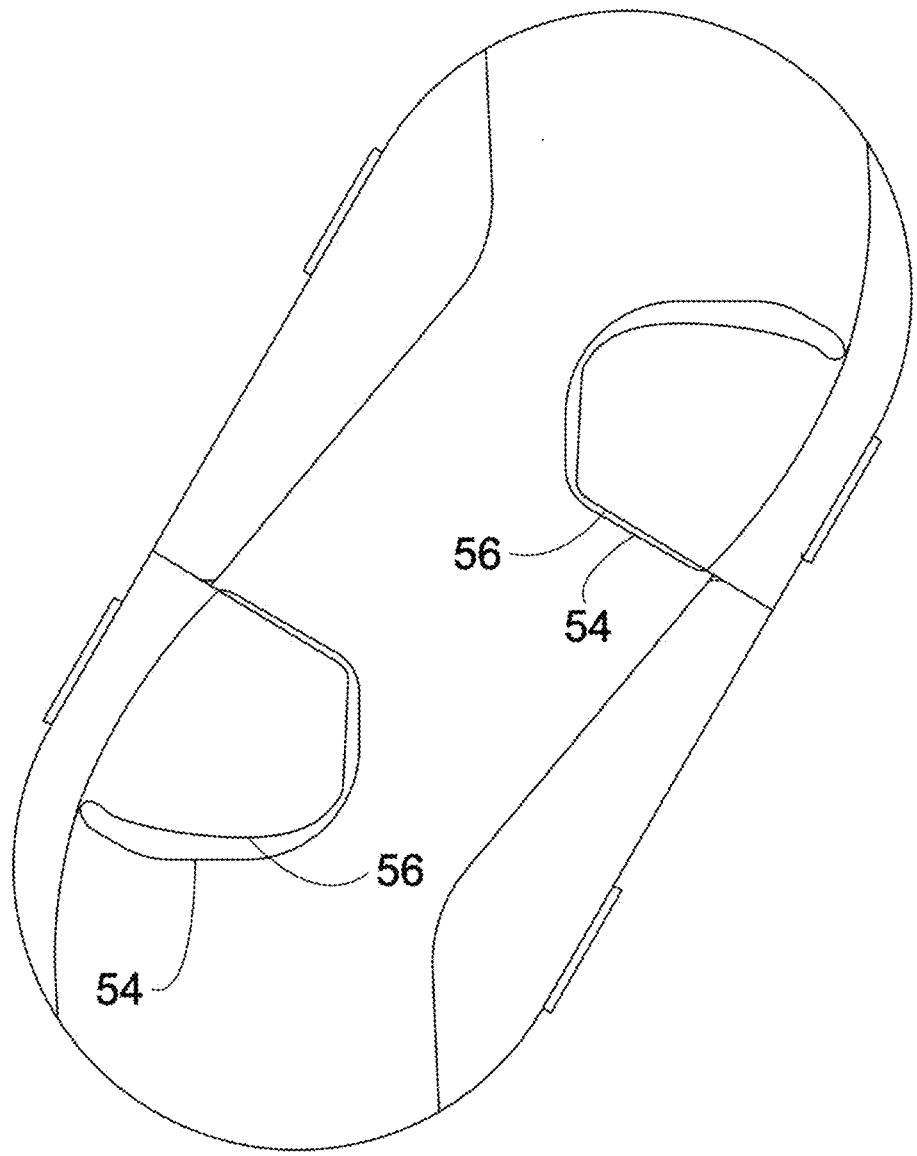
FIG. 5 shows an orthogonal projection of a detail of the one-piece part shown in FIG. 2 on a reference plane.

In orthogonal projection on a reference plane 400 perpendicular to the reference axis 300, and as shown in FIG. 5, each lumen 52 has an inner circumference 54 which surrounds or coincides with the orthogonal projection 56 of the guide face 50 of the associated deflector 48. In practice, this means that the guide face 50, and in this case the entire one-piece recirculation part 22, can be produced by injection molding in a two-shell mold that does not require slides to produce the deflectors 48. Indeed, it is possible to create, in one of the shells forming the mold cavity, reliefs which constitute, in the finished molded part, the bottom 32, the lumens 52 and the guide face 50, complementary reliefs being provided in the other shell, to delimit the opposite face of the deflectors 48, the ejection axis of the mold being parallel to the reference axis 300 of the part.

Along a loop path defined by two adjacent portions 28, 30 of the thread groove, on either side of a thread 26 of the recirculation threaded member 12, and by an associated recirculator 22, as well as by the threading 20 of the other threaded member 14 of the ballscrew mechanism 10, the balls 16 form a continuous thread, the clearance existing between two adjacent balls being less than the radius of the balls 16, and preferably less than 1/10 of the ball radius. When a ball 16 reaches one of the curved portions 46 where one of the lumens 52 opens out, the ball 16 is no longer in contact with the recirculation path 34, but is instead lifted by neighboring balls to come into contact with the guide face 50 of the deflector 48. The presence of lumens 52 does not therefore affect the guidance of balls 16. In addition, the lumen 52 is preferentially dimensioned in such a way that balls 16 cannot penetrate it, in order to manage an extreme operating situation wherein a ball 16 comes into contact with the lumen 52. As the balls 16 have very little load in the recirculation circuit, operation will not be affected.

Naturally, the example shown in the figures and discussed above is given only by way of illustration. The principle of inserting one or more lumens in the one-piece recirculation part is also applicable to recirculators positioned on a ballscrew mechanism nut. It is also applicable to a recirculator 22 with a single deflector 48.

The invention claimed is:

1. A one-piece recirculation part intended to be accommodated in a cavity of a threaded member of a ballscrew mechanism, the one-piece recirculation part having:
   a bottom, turned in a reference direction parallel to a reference axis of the recirculation part and intended to bear against a bottom of the cavity of the threaded member;
   a recirculation path turned in a direction opposite to the reference direction, designed to pass through a thread of the threaded member along a recirculation path;
   at least one first deflector, projecting from the recirculation path in the opposite direction to the reference direction, the first deflector forming a guide face, located at a distance from the recirculation path and facing in the reference direction; and
   at least one first lumen which opens out on a first end onto the bottom and on a second end onto the recirculation path, opposite the guide face, the first lumen having an orthogonal projection onto a reference plane perpendicular to the reference axis, which surrounds or coincides with an orthogonal projection of the guide face of the first deflector onto the reference plane.

2. The one-piece recirculation part of claim 1, further comprising:
   a second deflector, projecting from the recirculation path in the opposite direction to the reference direction, the second deflector forming a guide face, located at a distance from the recirculation path and facing in the reference direction, the one-piece recirculation part comprising at least one second lumen opening onto the bottom and onto the recirculation path of the one-piece recirculation part, opposite the guide face of the second deflector, the second lumen having an orthogonal projection onto the reference plane, which surrounds or coincides with the orthogonal projection of the guide face of the second deflector onto the reference plane.

3. The one-piece recirculation part of claim 1, wherein the recirculation path describes an S-shaped path with two ends, each intended to be continuous with a thread root on one side of the thread through which the recirculation path passes.

4. The one-piece recirculation part of claim 2, wherein the recirculation path describes an S-shaped path with two ends, each intended to be continuous with a thread root on one side of the thread through which the recirculation path passes, the first deflector is located at a curved portion of the S-shaped path, and the second deflector is located at a second curved portion of the S-shaped path.

5. The one-piece recirculation part of claim 1, wherein the bottom of the one-piece recirculation part is flat.

6. The one-piece recirculation part of claim 5, wherein the bottom of the one-piece recirculation part is perpendicular to the reference axis.

7. The one-piece recirculation part of claim 1, wherein the first lumen opens without undercuts in the reference direction.

8. A recirculation threaded member for a ballscrew mechanism, the recirculation threaded member having a threading, the recirculation threaded member being equipped with one or more recirculators, each of the recirculators being housed in a housing cavity of the recirculation threaded member, the housing cavity passing through a thread of the threading, wherein each of the recirculators is a one-piece recirculation part having:
   a bottom, turned in a reference direction parallel to a reference axis of the recirculation part and bearing against a bottom of the housing cavity;
   a recirculation path turned in a direction opposite to the reference direction, interconnecting two portions of a groove in the thread on either side of the thread traversed by the housing cavity along a recirculation path;
   at least one first deflector, projecting from the recirculation path in the opposite direction to the reference direction, the first deflector forming a guide face, located at a distance from the recirculation path and facing in the reference direction; and
   at least one first lumen which opens out on a first end onto the bottom and on a second end onto the recirculation path, opposite the guide face, the first lumen having an orthogonal projection onto a reference plane perpendicular to the reference axis, which surrounds or coincides with an orthogonal projection of the guide face of the first deflector onto the reference plane.

9. The recirculation threaded member of claim 8, equipped with a number N, N being greater than or equal to two of said recirculators, angularly offset from one another by an angle $$\frac{2\pi}{N}$$

about a helix axis of the threading.

10. The recirculation threaded member of claim 8, wherein the recirculation threaded member is a ballscrew mechanism screw.

11. The recirculation threaded member of claim 8, wherein the recirculation threaded member is a nut of a ballscrew mechanism.

12. A ballscrew mechanism comprising:
two threaded members, namely a screw and a nut, and balls, one of the two threaded members being a recirculation threaded member having a threading, the recirculation threaded member being equipped with one or more recirculators, each of the recirculators being housed in a housing cavity of the recirculation threaded member, the housing cavity passing through a thread of the threading, wherein each of the recirculators is a one-piece recirculation part having:
a bottom, turned in a reference direction parallel to a reference axis of the recirculation part and bearing against a bottom of the housing cavity;
a recirculation path turned in a direction opposite to the reference direction, interconnecting two portions of a groove in the thread on either side of the thread traversed by the housing cavity along a recirculation path;
at least one first deflector, projecting from the recirculation path in the opposite direction to the reference direction, the first deflector forming a guide face, located at a distance from the recirculation path and facing in the reference direction; and
at least one first lumen which opens out on a first end onto the bottom and on a second end onto the recirculation path, opposite the guide face, the first lumen having an orthogonal projection onto a reference plane perpendicular to the reference axis, which surrounds or coincides with an orthogonal projection of the guide face of the first deflector onto the reference plane,
the ballscrew mechanism further comprising balls forming one or more lines of balls, each associated with one of the one-piece recirculation parts, and each arranged along a loop path passing through the recirculation path of an associated one-piece recirculation part and through the two portions of the thread groove on either side of the thread through which the housing cavity passes.

13. The one-piece recirculation part of claim 2, wherein each of the first lumen and the second lumen opens without undercuts in the reference direction.

14. The recirculation threaded member of claim 8, equipped with a number N equal to three, of said recirculators, angularly offset from one another by an angle $$\frac{2\pi}{N}$$

about a helix axis of the threading.

* * * * *